United States Patent
Hsia

(10) Patent No.: US 6,623,855 B2
(45) Date of Patent: Sep. 23, 2003

(54) ETHYLENE-VINYL ACETATE COPOLYMER WAXES

(75) Inventor: H. T. Hsia, Bridgewater, NJ (US)

(73) Assignee: Honeywell International Inc., Morristown, NJ (US)

( * ) Notice: Subject to any disclaimer, the term of this patent is extended or adjusted under 35 U.S.C. 154(b) by 7 days.

(21) Appl. No.: 09/886,181

(22) Filed: Jun. 21, 2001

(65) Prior Publication Data

US 2002/0040121 A1 Apr. 4, 2002

Related U.S. Application Data

(60) Provisional application No. 60/213,099, filed on Jun. 21, 2000.

(51) Int. Cl.⁷ .......................... D02G 3/00; C08F 118/02
(52) U.S. Cl. ....................... 428/379; 428/375; 526/319; 174/110 PM
(58) Field of Search ..................... 526/319; 428/379, 428/375; 174/110 PM

(56) References Cited

U.S. PATENT DOCUMENTS

| | | | | |
|---|---|---|---|---|
| 3,368,991 A | * | 2/1968 | Rosenbaum ............... 260/28.5 |
| 4,091,200 A | | 5/1978 | Vandegaer ................. 528/495 |
| 4,095,019 A | | 6/1978 | Markiewitz et al. ........ 526/215 |
| 4,370,076 A | | 1/1983 | Sullivan et al. ............. 405/132 |
| 4,497,941 A | * | 2/1985 | Aliani et al. ................ 526/330 |
| 4,576,993 A | | 3/1986 | Tamplin et al. ............. 525/240 |
| 4,613,632 A | * | 9/1986 | Aliani et al. ................ 523/172 |
| 4,921,916 A | | 5/1990 | Howell et al. .............. 525/423 |
| 4,997,713 A | | 3/1991 | Koehnlein et al. .......... 428/379 |
| 5,182,349 A | | 1/1993 | Okada et al. ............... 526/265 |
| 5,547,801 A | | 8/1996 | Suzuki et al. ............... 430/115 |
| 5,576,401 A | | 11/1996 | Steiger et al. ............... 526/65 |
| 5,714,556 A | | 2/1998 | Johnson et al. ............. 526/135 |
| 6,013,202 A | | 1/2000 | Easter et al. ................ 252/511 |
| 6,239,208 B1 | * | 5/2001 | Halloran et al. ............ 524/487 |
| 2002/0040121 A1 | * | 4/2002 | Hsia ........................... 526/319 |

FOREIGN PATENT DOCUMENTS

WO    WO96/29710    9/1996    ............ H01B/7/34

OTHER PUBLICATIONS

DuPont, Thermal Properties of "ELVAX" Measured by Differential Scanning Calorimeter, 1997.*
DuPont, "ELVAX", For adhesive, Sealants and Wax Blends, 1997.*
DuPont, "ELVAX" Applications, 1997.*
DuPont, "ELVAX", For Molding, Compounding and Extrusion, 2001.*
Japanese Patent No. 5,174,639 (Mitsubishi Petrochem), Jul. 13, 1993, Inventor: Masaki (Abstract only).
Japanese Patent No. 11,181,176 (Nippon Unicar), Jul. 6, 1999, Inventor: Akio (Abstract only).

* cited by examiner

*Primary Examiner*—Cynthia H. Kelly
*Assistant Examiner*—J. M. Gray
(74) *Attorney, Agent, or Firm*—Scott D. Jacobson

(57) ABSTRACT

Disclosed are ethylene-vinyl acetate ("EVA") copolymer waxes comprising at least about 10%, by weight, of moieties derived from vinyl acetate, the copolymer having a polydispersity ("Mw/Mn") of at least about 6 and a molecular weight ("Mw") of from about 15,000 to about 40,000. Also disclosed are coatings and films comprising the present EVA waxes that exhibit sufficient adherence to and removability from a wide range of substrates.

27 Claims, No Drawings

ETHYLENE-VINYL ACETATE COPOLYMER WAXES

RELATED APPLICATION

This application claims the benefit of U.S. Provisional Application No. 60/213,099, titled "Ethylene-Vinyl Acetate Copolymers", filed on Jun. 21, 2000.

FIELD OF INVENTION

The present invention relates generally to ethylene-vinyl acetate ("EVA") copolymers, and more specifically, to EVA copolymer waxes having a unique combination of properties that find advantage in a variety of applications, particularly, as to highly strippable wire sheathing for insulated electrical conductors.

BACKGROUND OF THE INVENTION

Ethylene-vinyl acetate copolymer waxes find use in a wide variety of commercial applications and are of particular interest in the manufacture of coatings and/or films capable of adhering to various substrates. For example, because EVA waxes tend to exhibit relatively strong adhesive properties, such waxes have been added to plastic sheathing compositions to form wire sheaths that adhere with relatively high strength to the wire cores of insulated electrical conductors.

However, in addition to adhering strongly to substrates, it is often both desirable and advantageous in many applications to form coatings and/or films that are readily removable from a substrate with a minimum amount of force. In the wire sheathing industry, for example, it is often desirable to have sheaths which can be readily removed, or "stripped", to allow easy access to the conductive core for making electrical contact with the wires. See, for example, U.S. Pat. No. 6,013,202, which is incorporated herein by reference.

Unfortunately, as has been long recognized in the art, the use of traditional EVA waxes in wire sheathing applications has been problematic. More particularly, prior EVA waxes tend to form coatings requiring an undesirably high level of force to remove them from substrates. See, for example, U.S. Pat. No. 6,013,202. This is disadvantageous in that applications requiring removal of prior art coatings and films result in an increase in the amount of work required to perform removal applications and the costs associated therewith. Recognizing these and other drawbacks, applicants have developed the present invention, in part, to overcome the drawbacks of the prior art.

SUMMARY OF THE INVENTION

The present invention relates to novel EVA copolymers which find particular use and offer numerous advantages in the manufacture of removable coatings and films, including wire sheathing. For example, the preferred EVA copolymer waxes of the present invention can be added to plastic sheathing compositions used to form sheaths which not only adhere sufficiently to wires, but can also be advantageously removed from the wire core using less force than has been heretofore required to remove traditional wire sheaths. The present invention thus produces products which are capable of reducing the effort associated with making electrical connections in the field and which tend to reduce the costs associated therewith. In addition, the waxes of the present invention can be used as simple "drop-in" replacements for traditional EVA waxes. That is, in certain applications, the present waxes can be readily substituted for traditional EVA waxes in sheathing compositions without the need for modification of existing equipment or requalification of existing products.

According to certain preferred embodiments, the present invention provides an EVA copolymer comprising at least about 10% by weight of at least one moiety derived from vinyl acetate, the copolymer having a polydispersity ("Mw/Mn") of at least about 6 and a molecular weight ("Mw") of from about 15,000 to about 40,000.

In certain other preferred embodiments, the present invention provides a substrate coating composition comprising an EVA copolymer comprising at least about 10% by weight of at least one moiety derived from vinyl acetate, the copolymer having a polydispersity ("Mw/Mn") of at least about 6 and a molecular weight ("Mw") of from about 15,000 to about 40,000.

The present invention further provides a film comprising an EVA copolymer wax comprising at least about 10% by weight of at least one moiety derived from vinyl acetate, the copolymer having a polydispersity ("Mw/Mn") of at least about 6 and a molecular weight ("Mw") of from about 15,000 to about 40,000.

Additionally, the present invention provides an insulated electrical conductor comprising a conductive core and an insulating sheath substantially surrounding the core, said sheath comprising an EVA copolymer wax comprising at least about 10% by weight of moieties derived from vinyl acetate, the copolymer wax having a Mw/Mn of at least about 6 and a Mw of from about 15,000 to about 40,000.

DETAILED DESCRIPTION OF INVENTION AND PREFERRED EMBODIMENTS

The preferred ethylene-vinyl acetate copolymer waxes of the present invention are formed by the copolymerization of ethylene and vinyl acetate monomers. As used herein, the term "wax" refers generally to oligomeric polymer compounds having the following properties: (a) solid at room temperature; (b) low melting point; and (c) insoluble in water. An "EVA copolymer wax" or "EVA wax", as used herein, refers generally to oligomeric polymer compounds having the aforementioned properties that are prepared via a process comprising the co-polymerization of ethylene monomers and vinyl acetate monomers.

In general, the present copolymer waxes comprise at least 10% by weight of at least one moiety derived from vinyl acetate, based on the total weight of the EVA copolymer. EVA waxes comprising less than about 10 weight % of vinyl acetate typically do not exhibit the unexpected and beneficial properties associated with the polymers of the present invention.

In certain preferred embodiments, the EVA copolymer waxes of the present invention comprise from about 10 to about 40 wt % of at least one moiety derived from vinyl acetate, in more preferred embodiments from about 11 to about 30 wt %, and even more preferably, from about 12 to about 25 wt %.

The number average molecular weight ("Mn") of the EVA copolymers of the present invention preferably ranges from about 1,500 to about 3,100, as measured using known Gel Permeation Chromatography ("GPC") methods. More preferably, the Mn is from about 1,800 to about 2,800, and even more preferably from about 1,900 to about 2,700. Methods for determining Mn, including GPC methods, are known to those of skill in the art.

The weight average molecular weight ("Mw") of the present EVA copolymers preferably ranges from about 15,000 to about 40,000, as measured using known Gel Permeation Chromatography ("GPC") methods. More preferably, the Mw is from about 20,000 to about 35,000, and even more preferably from about 25,000 to about 30,000. Methods for determining Mw, including GPC methods, are known to those of skill in the art.

The EVA copolymers of the present invention have a relatively high polydispersity index. As used herein, the term "polydispersity index" refers generally to the ratio of weight average molecular weight to number average molecular weight ("Mw/Mn") of an EVA copolymer wax. This ratio, as will be understood by those of skill in the art, describes and is related to the molecular weight distribution of a polymer. A higher ratio indicates a broader distribution of molecular weights, while a lower ratio indicates a narrower distribution. Preferably, the copolymers of the present invention have a polydispersity index of at least about 6, more preferably, of from about 7 to about 20, and even more preferably of from about 7 to about 16.

The melt viscosity of the EVA copolymer waxes of the present invention is preferably from about 500 to about 1600 centipoise ("cps") at 140° C. as measured using a Brookfield Viscometer. Preferably, the melt viscosity is from about 550 to about 1400 cps at 140° C., and even more preferably from about 600 to about 1300 cps at 140° C.

The EVA copolymers of the present invention preferably have a hardness of from about 5 deci-millimeters ("dmm") to about 30 dmm as measured via ASTM D-5 for petroleum waxes. Preferably, the copolymers have a hardness of from about 6 dmm to about 25 dmm, and more preferably from about 7 dmm to about 25 dmm.

The Mettler drop points of the copolymer waxes of the present invention preferably range from about 70 to about 95° C. Preferably, the Mettler drop points range from about 75 to about 90° C.

The EVA copolymers of the present invention can be made using the same class of processes known to those of skill in the art. For example, the present waxes can be made by carefully selecting the parameters at typical known low pressure polymerization processes, including, for example, the processes disclosed in U.S. Pat. Nos. 4,095,019 (assigned to ICI) and 5,714,556 (assigned to DuPont), both of which are incorporated herein filly by reference. In addition, it is contemplated that the present waxes can also be made by selecting the appropriate combination of processing parameters in known high pressure free radical polymerization processes, such as those disclosed in U.S. Pat. Nos. 4,091,200 (assigned to Dart), 4,095,019 (assigned to ICI), and 5,182,349 (assigned to Mitsubishi), all of which are incorporated herein by reference.

In high pressure processes, the copolymers of the present invention are produced generally by running the reactions within a temperature range that is at or below the lower end of the temperature range heretofore used for high pressure free radical polymerization, particularly as described in U.S. Pat. Nos. 4,091,200 and 5,182,349. In view or the teachings contained herein those skilled in the art will be able to manipulate the reactions without undue experimentation, to provide a copolymer wax having the preferred molecular weight and other preferred characteristics described herein.

Applicants have discovered that the manufacture of the present materials using operating temperatures at or below the lower end of the heretofore used temperature ranges has startlingly produced a wax having unusual properties, i.e., a higher than expected polydispersity index (above about 6) and a higher than expected Mw (from about 15,000 to about 40,000). At the same time, an expected increase in crystallinity of the waxes does not seem to occur. This unexpected combination of properties results in EVA waxes which can be used to form coatings and films exhibiting not only sufficient strength to adhere to substrates, but also beneficial release characteristics, that is, they are more easily removed from the substrates than comparable prior art coatings and films.

Based on the disclosure of the incorporated references, coupled with teaching contained in the present disclosure, those of skill in the art will be readily able to produce the EVA waxes of the present invention without undue experimentation.

COATINGS AND FILMS

The present EVA waxes can be used in formation of coatings and films for use in a wide variety of applications. For example, the present coatings can be applied to wires or cables via known means and processed to form films which adhere to but at the same time are readily removable, i.e. strippable, from such wires or cables.

The coatings and/or films of the present invention generally comprise at least one EVA wax comprising at least about 10% by weight, based on the copolymer weight, of at least one moiety derived from vinyl acetate, the copolymer having a polydispersity ("Mw/Mn") of at least about 6 and a molecular weight ("Mw") of from about 15,000 to about 40,000. Such coatings are especially useful in applications wherein it is desirable for the coatings to not only adhere sufficiently to a substrate, but also to be removable from said substrate with relative ease.

Preferably, the present coatings and/or films comprise from about 3 to about 40% by weight of an EVA wax of the present invention. More preferably, the present coatings comprise from about 4 to about 35 weight % of EVA copolymer, and even more preferably from about 5 to about 20 weight %.

The coatings and/or films may further comprise any of a wide range of additives, fillers, plastics or polymers known in the art. Examples of such known compositions for use in the manufacture of EVA coatings and films are described in U.S. Pat. Nos. 4,370,076, 4,921,916, and 6,013,202, each of which is incorporated herein fully by reference.

The present removable coatings and films can be used to adhere to any of a wide range of substrates including: metal and/or synthetic wires and cables, and the like. In certain preferred embodiments, the coatings of the present invention are formed into wire sheaths which adhere to and are removable from wire or cable substrates.

The present coatings and films can be produced via any of a wide range of known methods for producing coatings and/or films According to certain embodiments, the coatings and films of the present invention are produced by adding an EVA copolymer wax comprising at least about 10% by weight of the copolymer wax of moieties derived from vinyl acetate, the copolymer having a Mw/Mn of at least about 6 and a Mw of from about 15,000 to about 40,000, to a plastic coating composition. For example, wire sheaths comprising the present EVA waxes can be produced via methods disclosed in U.S. Pat. Nos. 4,370,076, 4,921,916, and 6,013,202, incorporated herein fully by reference. In light of the disclosures of these references and the disclosure herein, one of skill in the art would be readily able to produce coatings, films and wire sheaths of the present invention without undue experimentation.

In general, the coatings and films of the present invention can be removed from a substrate using less force than is required to remove comparable prior art coatings and/or films from similar substrates. Those of skill in the art will recognize that the amount of force required to remove a coating or film from a substrate can be measured via plaque adhesion peel tests and/or cable peel tests (for applications wherein the substrate is a wire or cable) as described in U.S. Pat. No. 6,013,202. Preferably, the amount of force required to remove a coating or film of the present invention from a wire core substrate, as measured by the aforementioned cable adhesion methods, is less than about 15 pounds per ½ inch. More preferably, the amount of force is less than about 13 pounds per ½ inch, and even more preferably, less than about 11 pounds per ½ inch.

EXAMPLES

In order to illustrate, in a non-limiting manner, the present invention is described in connection with the following examples.

Examples 1–9

Nine EVA copolymers (numbered 1 through 9) are produced via high-pressure free radical polymerization processes run at or below the lower end of the heretofore used temperature ranges. The Mw, Mn, and Mw/Mn values, as well as, the Mz (the highest molecular fraction), Mpeak (peak value from which other values are averaged), and the Mz/Mw are determined for each of the copolymers using known Gel Permeation Chromatography ("GPC") methods. In addition, the weight percents of moieties derived from vinyl acetate ("wt % VA") present in copolymers 4–9 are calculated. Table 1 shows the molecular weight and weight percent vinyl acetate data for copolymers 1–9.

TABLE 1

| EVA wax | Mz | Mpeak | Mw | Mn | Mw/Mn | Mz/Mw | wt % VA |
|---|---|---|---|---|---|---|---|
| 1 | 146,950 | 9480 | 28100 | 2435 | 11.56 | 5.23 | |
| 2 | 190,850 | 8785 | 30400 | 2170 | 14.04 | 6.28 | |
| 3 | 159,150 | 8140 | 25650 | 2195 | 11.69 | 6.20 | |
| 4 | 219,100 | 8,140 | 29,200 | 2,660 | 10.98 | 7.50 | 16.44 |
| 5 | 224,900 | 8,570 | 33,800 | 2,550 | 13.25 | 6.65 | 15.26 |
| 6 | 229,300 | 7,350 | 30,000 | 1,880 | 15.96 | 7.64 | 18.95 |
| 7 | 283,800 | 9,170 | 35,700 | 2,390 | 14.94 | 7.95 | 16.37 |
| 8 | 222,800 | 8,280 | 31,000 | 2,990 | 10.37 | 7.19 | 18.14 |
| 9 | 108,600 | 9,020 | 22,300 | 3,040 | 7.34 | 4.87 | 19.03 |

Examples 10–14

Five EVA copolymer waxes (labeled 10–14) are produced as described above. The Mn, Mw, Mw/Mn and Mz are determined for each copolymer using known GPC methods. Such data is shown in Table 2.

TABLE 2

| EVA wax | Mn | Mw | Mw/Mn | Mz |
|---|---|---|---|---|
| 10 | 2310 | 15400 | 6.7 | 68900 |
| 11 | 1860 | 25400 | 13.7 | 139400 |
| 12 | 2030 | 29000 | 14.3 | 193100 |
| 13 | 1980 | 28900 | 14.6 | 168000 |
| 14 | 2130 | 27500 | 12.9 | 213000 |

Comparative Example 1

An EVA copolymer wax ("CE 1") is produced via high pressure polymerization techniques under traditional conditions. The Mz, Mpeak, Mw, Mn, Mw/Mn, and Mz/Mw are determined for each of the waxes using known GPC methods. Such data is shown in Table 3.

TABLE 3

| EVA wax | Mz | Mpeak | Mw | Mn | Mw/Mn | Mz/Mw |
|---|---|---|---|---|---|---|
| CE1 | 16,300 | 8,895 | 9,460 | 3,265 | 2.90 | 1.72 |

Examples 15–38

Twenty-four EVA waxes (labeled 15–38) are produced via high-pressure free radical polymerization run at or below the lower end of the heretofore used temperature ranges. The weight percent vinyl acetate, Mettler Drop Point, viscosity, and hardness data are measured, using standard methods, for the waxes. Such data is reported in Table 4.

TABLE 4

| Number/ Properties | % VA | Mettler Drop Point ° C. | Viscosity cps @ 140° C. | Hardness dmm @ 25° C. |
|---|---|---|---|---|
| 15 | 12.4 | 87.6 | 945 | 9 |
| 16 | 14.4 | 84.0 | 895 | 14 |
| 17 | 16.2 | 82.8 | 845 | 13 |
| 18 | 18.1 | 78.9 | 755 | 20 |
| 19 | 20.0 | 76.5 | 740 | 22 |
| 20 | 17.1 | 81.1 | 747 | 20 |
| 21 | 12.2 | 84.0 | 788 | 19 |
| 22 | 13.2 | 81.7 | 482 | 19 |
| 23 | 15.7 | 79.9 | 806 | 20 |
| 24 | 15.8 | 85.4 | 854 | 12.5 |
| 25 | 15.0 | 84.0 | 722 | 15 |
| 26 | 15.1 | 84.8 | 1275 | 10.5 |
| 27 | 16.7 | 84.0 | 988 | 12.5 |
| 28 | 17.8 | 78.3 | 610 | 20 |
| 29 | 15.1 | 85.8 | 677 | 12.7 |
| 30 | 16.8 | 84.1 | 824 | 12.6 |
| 31 | 16.9 | 85.9 | 1010 | 12.5 |
| 32 | 16.9 | 84 | 693 | 13.5 |
| 33 | 16.1 | 83.8 | 993 | 9 |
| 34 | 17.9 | 83.7 | 947 | 9 |
| 35 | 15.9 | 84.9 | 792 | 14 |
| 36 | 19 | 83 | 876 | 13.3 |
| 37 | 19 | 83.1 | 983 | 14 |
| 38 | 16 | 83 | 877 | 11.5 |

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An EVA copolymer wax comprising at least about 10% by weight, of at least one moiety derived from vinyl acetate, the copolymer having an Mw/Mn of at least about 6 and a Mw of from about 15,000 to about 40,000.

2. The EVA copolymer wax of claim 1 wherein said copolymer wax has a Mettler Drop point of from about 70° C. to about 95° C.

3. The EVA copolymer wax of claim 2 wherein said copolymer wax has a melt viscosity of from about 500 to about 1600 cps at 140° C.

4. The EVA copolymer wax of claim 3 wherein said copolymer wax has a hardness of about 5 dmm to about 30 dmm.

5. The EVA copolymer wax of claim 1 wherein said copolymer wax comprises from about 10 to about 40 weight percent of at least one moiety derived from vinyl acetate and an Mw/Mn of from about 7 to about 20.

6. The EVA copolymer wax of claim 5 wherein said copolymer wax has a Mettler Drop point of from about 75° C. to about 90° C.

7. The EVA copolymer wax of claim 6 wherein said copolymer wax has a melt viscosity of from about 550 to about 1400 cps at 140° C.

8. The EVA copolymer wax of claim 7 wherein said copolymer wax has a hardness of about 6 dmm to about 25 dmm.

9. The EVA copolymer wax of claim 7 wherein said copolymer wax has a hardness of about 7 dmm to about 25 dmm.

10. The EVA copolymer wax of claim 9 wherein said wax comprises from about 12 to about 25 weight percent of moieties derived from vinyl acetate.

11. The EVA copolymer wax of claim 6 wherein said copolymer wax comprises from about 11 to about 30 weight percent of at least one moiety derived from vinyl acetate, a Mn/Mn of from about 7 to about 16, and a Mw of from about 20,000 to about 35,000.

12. The EVA copolymer wax of claim 6 wherein said copolymer wax has a melt viscosity of from about 600 to about 1300 cps at 140° C.

13. The EVA copolymer wax of claim 1 wherein at least one moiety comprises at least two moities.

14. A coating comprising an EVA copolymer wax comprising at least about 10%, by weight of the copolymer, of moieties derived from vinyl acetate, the copolymer having an Mw/Mn of at least about 6 and a Mw of from about 15,000 to about 40,000.

15. The coating of claim 14 wherein said EVA copolymer wax has an Mw/Mn of from about 7 to about 20.

16. The coating of claim 14 wherein said EVA copolymer wax has an Mw of from about 20,000 to about 35,000.

17. A film comprising an EVA copolymer wax comprising at least about 10%, by weight, of moieties derived from vinyl acetate, the copolymer having an Mw/Mn of at least about 6 and a Mw of from about 15,000 to about 40,000.

18. An insulated electrical conductor comprising a conductive core and an insulated sheath substantially surrounding the core, said sheath comprising an EVA copolymer wax comprising at least about 10%, by weight, of moieties derived from vinyl acetate, the copolymer having an Mw/Mn of at least about 6 and a Mw of from about 15,000 to about 40,000.

19. The conductor of claim 18 wherein said copolymer wax has a Mettler Drop point of from about 70° C. to about 95° C.

20. The conductor of claim 19 wherein said copolymer wax has a melt viscosity of from about 500 to about 1600 cps at 140° C.

21. The conductor of claim 20 wherein said copolymer wax has a hardness of about 5 dmm to about 30 dmm.

22. The conductor of claim 18 wherein said copolymer wax comprises from about 10 to about 40 weight percent of moieties derived from vinyl acetate and an Mw/Mn of from about 7 to about 20.

23. The conductor of claim 22 wherein said copolymer wax has a Mettler Drop point of from about 75° C. to about 90° C.

24. The conductor of claim 23 wherein said copolymer wax has a melt viscosity of from about 550 to about 1400 cps at 140° C.

25. The conductor of claim 24 wherein said copolymer wax has a hardness of about 6 dmm to about 25 dmm.

26. The conductor of claim 23 wherein said copolymer wax comprises from about 11 to about 30 weight percent of moieties derived from vinyl acetate, a Mn/Mn of from about 7 to about 16, and a Mw of from about 20,000 to about 35,000.

27. A method of using an EVA copolymer comprising at least about 10%, by weight, of moieties derived from vinyl acetate, the copolymer having an Mw/Mn of at least about 6 and a Mw of from about 15,000 to 40,000, to make a wire sheath, said method comprising the step of blending the EVA copolymer with a plastic coating composition.

* * * * *